(12) United States Patent
Noorizadeh et al.

(10) Patent No.: US 12,407,777 B2
(45) Date of Patent: Sep. 2, 2025

(54) PERFORMANCE OPTIMIZATION FOR REAL-TIME LARGE LANGUAGE SPEECH TO TEXT SYSTEMS

(71) Applicant: Bank of America Corporation, Charlotte, NC (US)

(72) Inventors: Emad Noorizadeh, Plano, TX (US); Emmanuel Dibia, Dallas, TX (US); Jennifer Russell, Dallas, TX (US); Rajan Jhaveri, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 290 days.

(21) Appl. No.: 18/204,981

(22) Filed: Jun. 2, 2023

(65) Prior Publication Data
US 2024/0406314 A1 Dec. 5, 2024

(51) Int. Cl.
*H04M 3/493* (2006.01)
*G10L 15/26* (2006.01)

(52) U.S. Cl.
CPC ........... *H04M 3/4936* (2013.01); *G10L 15/26* (2013.01)

(58) Field of Classification Search
CPC ....... H04M 3/4936; G10L 15/26; G10L 15/16
See application file for complete search history.

(56) References Cited

U.S. PATENT DOCUMENTS

| | | | |
|---|---|---|---|
| 11,017,778 B1 * | 5/2021 | Thomson | H04M 3/42382 |
| 11,276,392 B2 * | 3/2022 | Thomson | G10L 15/30 |
| 11,711,469 B2 * | 7/2023 | Brink | G10L 15/22 |
| | | | 379/88.01 |
| 11,935,540 B2 * | 3/2024 | Thomson | H04M 3/42382 |
| 2002/0169606 A1 * | 11/2002 | Bantz | H04M 3/523 |
| | | | 704/235 |
| 2004/0024598 A1 * | 2/2004 | Srivastava | G10L 15/26 |
| | | | 704/235 |
| 2015/0100302 A1 * | 4/2015 | Flaks | G10L 15/16 |
| | | | 704/9 |
| 2016/0118041 A1 * | 4/2016 | Flaks | G10L 15/1822 |
| | | | 704/232 |
| 2021/0073199 A1 * | 3/2021 | Bettaglio | G06F 40/35 |

OTHER PUBLICATIONS

Radford et al., "Robust Speech Recognition via Large-Scale Weak Supervision," https://doi.org/10.48550/arXiv.2212.04356, Dec. 6, 2022.

* cited by examiner

*Primary Examiner* — Lisa Hashem
(74) *Attorney, Agent, or Firm* — Weiss & Arons LLP

(57) ABSTRACT

Methods and systems for transcribing communications are provided. Methods may include receiving a communication. Methods may include splitting the communication into a plurality of communication segments. Each communication segment may include two or more words. Methods may include transcribing each segment included in the plurality of communication segments, in parallel. The transcribing may include using a transformer neural network to transcribe each segment included in the plurality of communication segments. Methods may include generating a transcription from the transcribing. The transcription may be generated by combining the transcription of each of the communication segments into a combined transcription. Methods may include correcting the combined transcription.

15 Claims, 4 Drawing Sheets

Audio Communication (102)

hi my name is john smith do you have my account balance on my 9390 checking account it would be my pleasure to help you with that give me a minute to look up the information your account balance on your 9390 checking account is $7,365.33

Audio Segment 1 (104): hi my name is john smith do you have my

Audio Segment 2 (106): account balance on my 9390 checking account it would be

Audio Segment 3 (108): my pleasure to help you with that give me a

Audio Segment 4 (110): minute to look up the information your account balance on

Audio Segment 5 (112): your 9390 checking account is $7,365.33

FIG. 1

PERFORMANCE OPTIMIZATION FOR REAL-TIME LARGE LANGUAGE SPEECH TO TEXT SYSTEMS

FIELD OF TECHNOLOGY

Aspects of the disclosure relate to speech to text systems.

BACKGROUND OF THE DISCLOSURE

Speech to text systems may be used by interactive voice response systems. The speech to text systems may transcribe the communications between human callers and the interactive voice response systems.

Available speech to text systems may be computationally expensive and introduce latency. Therefore, it may be desirable to split each communication into multiple segments. It would be further desirable to process each of the multiple segments in parallel.

It should be noted that a layer of accuracy may be lost in the splitting of each communication because legacy speech to text systems may not be designed to decipher phrases accurately. Rather, the legacy speech to text systems may only be designed to decipher an entire conversation accurately.

Therefore, it would be further desirable to utilize a combination processing system to combine the multiple segments and correct inaccuracies after the communication segments are transcribed.

SUMMARY OF THE DISCLOSURE

Apparatus and methods for a performance optimization method that reduces resource consumption is provided. The method includes splitting the call into smaller chunks. The chunks may be thirty second chunks. The chunks may be less than thirty second chunks. The chunks may be any other suitable size chunks. The processing of the various chunks of the conversation may be processed in parallel. Although a layer of accuracy may be lost in the segmenting of the call, a combination process may correct inaccuracies after the conversation has been transcribed. It should be noted that legacy systems may be designed to decipher an entire conversation and not phrases.

Breaking down conversations into smaller chunks may enable rapid processing of the transcribing by transcribing the communication chunks using parallel processing computing techniques. Such a system may initially generate less than completely accurate responses. The system may also include a correction model that may fix mistakes after the parallel processing. The system may create a complete more accurate transcription in shorter time periods with less resource consumption than legacy systems.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative diagram in accordance with principles of the disclosure;

DETAILED DESCRIPTION OF THE DISCLOSURE

Figure 2:
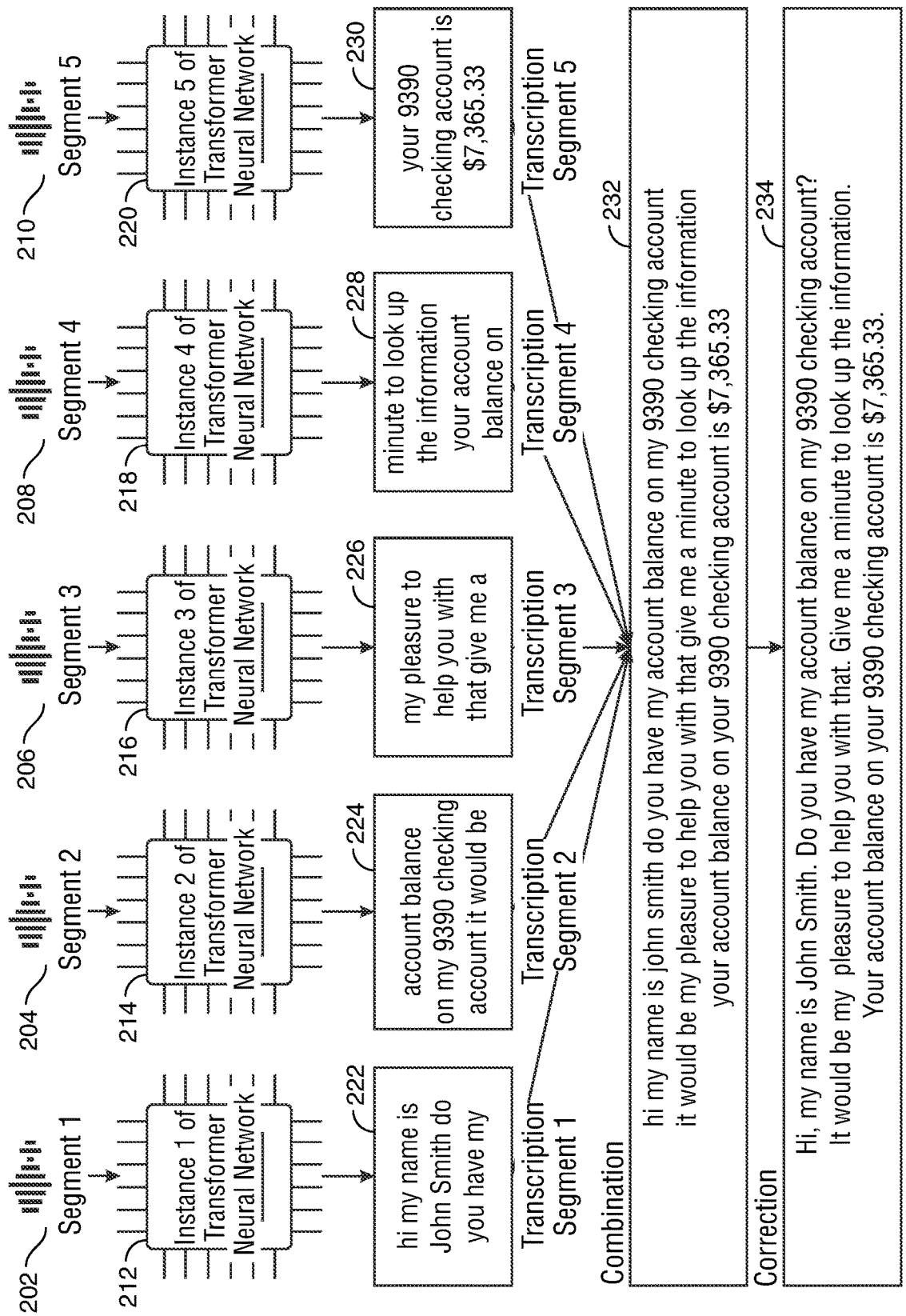
FIG. 2 shows another illustrative diagram in accordance with principles of the disclosure.

Apparatus and methods for maintaining accuracy in transcribing a communication is provided. Methods may include receiving a communication. The communication may be received at a first environment. The first environment may include a processor. The first environment may include associated computing components. The processor and the associated computing components may be specialized for transcription.

The communication may occur between a human caller and an interactive voice response system. The communication may be an interaction between any two suitable parties. The communication may be a real-time communication. The communication may be a historical or recorded communication.

Methods may include transcribing the communication. The transcribing may generate a first transcription. The transcribing may occur using a robust speech recognition model. The robust speech recognition model may use a large-scale weak supervision model. The weak supervision model may be a machine learning model where noisy, limited, or imprecise sources may be used to provide a supervision signal for labeling large amounts of training data in a supervised learning setting.

The robust speech recognition via large-scale weak supervision model may include a transformer neural network. The transformer neural network may be a deep learning model that may use self-attention to identify a significance weight for each portion of the input data. Transformer neural networks may be used in natural language processing. Unlike recurrent neural networks, transformer neural networks may process the entire input in one complete iteration. The transformer neural network may take an input sequence and convert it into a vector called an encoding, and then decode it back into another sequence. Transformer neural networks may be used to solve sequence-to-sequence tasks and may be capable of processing long-range dependencies.

Methods may include receiving the communication in a second environment. The second environment may include a processor. The second environment may include associated computing components. The processor and the associated computing components may be specialized for transcription. Methods may include splitting the communication into a plurality of communication segments. Each communication segment may include two or more words. Each communication segment may include thirty seconds of the communication. Each communication segment may include less than thirty seconds of the communication. The communication may be split using a predetermined amount of time, such as thirty seconds, twenty seconds or other suitable time period. The communication may be split using a predetermined amount of words, such as ten words, twenty words or other suitable number of words.

Methods may include identifying a number of communication segments included in the plurality of communication segments. Methods may include instantiating a plurality of instances of the robust speech recognition via large-scale weak supervision model. The integer number of instances, included in the plurality of instances, may be equivalent to the number of communication segments. As such, each communication segment may be assigned, or linked to, an instance of the model.

Methods may include assigning each communication segment to an instance of the robust speech recognition via large-scale weak supervision model. The instance may be one of the plurality of instances of the robust speech recognition via large-scale weak supervision model.

Methods may include transcribing each communication segment. The transcribing may include using parallel processing of the remaining instances. The transcribing may include using the assigned instance of the robust speech recognition via large-scale weak supervision model. The transcribing may transcribe the communication segment into a transcribed communication segment.

Methods may include combining the transcribed communication segments into a combined transcription. Methods may include correcting the combined transcription using a domain-specific correction module. The domain-specific correction module may be specific to a discipline, such as a financial industry. As such, the correction module may be able to fine tune transcriptions that may be associated with a financial industry.

Methods may include using the second environment to transcribe incoming communications. As such, the second environment may be used to transcribe communications as received in real-time and/or historical communications.

Methods may include a test environment. The test environment may include a processor. The test environment may include associated computing components. The processor and the associated computing components may be specialized for testing. The test environment may identify a first quantifiable resources value. The first quantifiable resource value may be calculated based on the amount of resources (or number of processor cycles) consumed by transcribing the communication using the robust speech recognition via large-scale weak supervision model.

The test environment may identify a first accuracy level. The first accuracy level may be the level of accuracy of the first transcription. The test environment may identify a second quantifiable resources value.

The second quantifiable resources value may be calculated based on the amount of resources consumed by transcribing the communication using the plurality of instances of the robust speech recognition via large-scale weak supervision model.

The test environment may determine that the first quantifiable resources value is greater than the second quantifiable resources value. The first quantifiable resource value may be greater than the second quantifiable resources value by over a predetermined resources value threshold.

The test environment may guarantee that the first quantifiable resources value is greater than the second quantifiable resources value. The test environment may guarantee or confirm that first quantifiable resources value is greater than the second quantifiable resources value by over a predetermined resources value threshold.

The test environment may identify a second accuracy level. The second accuracy level may be the level of accuracy of the combined transcription.

The test environment may determine that the first accuracy level is greater than the second accuracy level. The first accuracy level may be greater than the second accuracy level by over a predetermined accuracy level threshold.

The test environment may guarantee or confirm that the first accuracy level is greater than the second accuracy level. The test environment may guarantee that the first accuracy level is greater than the second accuracy level by over a predetermined accuracy level threshold.

The test environment may identify a third quantifiable resources value. The third quantifiable resources value may be calculated based on an amount of resources (or number of processor cycles) consumed by correcting the combined transcription using the domain-specific correction module;

The test environment may identify a third accuracy level. The third accuracy level may be based on the level of accuracy of the combined transcription upon completion of correcting the combined transcription using the domain-specific correction module.

The test environment may determine that the third accuracy level is equivalent to, or greater than, the first accuracy level.

The test environment may guarantee that the third accuracy level is equivalent to, or greater than, the first accuracy level.

The test environment may identify a fourth quantifiable resources value. The fourth quantifiable resources value may be calculated based on the third quantifiable resources value. The third quantifiable resources value may include the second quantifiable resources value and the third quantifiable resources value.

The test environment may determine that the fourth quantifiable resources value is less than the first quantifiable resources value. The test environment may guarantee, or confirm, that the fourth quantifiable resources value is less than the first quantifiable resources value.

Apparatus and methods for maintaining accuracy in transcribing a communication. Systems may include a first environment. The first environment may include a processor. The first environment may include associated computing components. The processor and the associated computing components may be specialized for transcription.

The first environment may include a transformer neural network. The transformer neural network may be a deep learning model that may use self-attention to identify a significance weight for each portion of the input data. Transformer neural networks may be used in natural language processing. Unlike recurrent neural networks, transformer neural networks may process the entire input in one complete iteration. The transformer can take an input sequence and convert it into a vector called an encoding, and then decode it back into another sequence. Transformer neural networks may be used to solve sequence-to-sequence tasks and may be capable of processing long-range dependencies.

The transformer neural network may receive an audio communication. The audio communication may occur between a human caller and an interactive voice response system. The audio communication may be any suitable audio communication. The transformer neural network may transcribe the audio communication into a first transcription.

Systems may include a second environment. The second environment may include a processor. The second environment may include associated computing components. The processor and the associated computing components may be specialized for transcription. Systems may include using the second environment to transcribe incoming communications.

The second environment may include a receiver. The receiver may receive the audio communication. The audio communication may be a real-time audio communication and/or a recorded or historical audio communication. The second environment may include a segmentation model. The segmentation model may segment the audio communication into a plurality of communication segments. Each communication segment may include thirty or less seconds of the audio communication.

The second environment may include a transcriber. The transcriber may be a transcription module operating on a processor. The transcriber may instantiate an instance of a transformer neural network for each communication segment included in the plurality of communication segments. The transcriber may transcribe, using parallel processing, each communication segment. Each communication segment may be included in the plurality of communication segments. The transcriber may transcribe using the instance of the transformer neural network instantiated for the communication segment. The transcriber may combine the transcribed communication segments into a combined transcription. The transcriber may correct the combined transcription using a domain-specific corrector.

Systems may include a test environment. The test environment may include a processor. The test environment may include associated computing components. The processor and the associated computing components may be specialized for testing. The test environment may identify a first quantifiable resources value. The first quantifiable resource value may be calculated based on the amount of resources (number of processor cycles) consumed by transcribing the communication using the robust speech recognition via large-scale weak supervision model.

The test environment may identify a first accuracy level. The first accuracy level may be the level of accuracy of the first transcription. The test environment may identify a second quantifiable resources value.

The second quantifiable resources value may be calculated based on the amount of resources (number of processor cycles) consumed by transcribing the communication using the plurality of instances of the robust speech recognition via large-scale weak supervision model.

The test environment may determine that the first quantifiable resources value is greater than the second quantifiable resources value. The first quantifiable resource value may be greater than the second quantifiable resources value by over a predetermined resources value threshold.

The test environment may identify a second accuracy level. The second accuracy level may be the level of accuracy of the combined transcription.

The test environment may determine that the first accuracy level is greater than the second accuracy level. The first accuracy level may be greater than the second accuracy level by over a predetermined accuracy level threshold.

The test environment may identify a third quantifiable resources value. The third quantifiable resources value may be calculated based on an amount of resources consumed by correcting the combined transcription using the domain-specific correction module;

The test environment may identify a third accuracy level. The third accuracy level may be based on the level of accuracy of the combined transcription upon completion of correcting the combined transcription using the domain-specific correction module.

The test environment may determine that the third accuracy level is equivalent to or greater than the first accuracy level.

The test environment may identify a fourth quantifiable resources value. The fourth quantifiable resources value may be calculated based on the third quantifiable resources value. The third quantifiable resources value may include the second quantifiable resources value and the third quantifiable resources value.

The test environment may determine that the fourth quantifiable resources value is less than the first quantifiable resources value.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows audio communication 102. Audio communication 102 may be from a real time conversation. Audio communication 102 may be from a historical conversation. Audio communication 102 may be from any suitable conversation. Audio communication 102 may include a plurality of words.

Audio communication 102 may be split into communication segments 104, 106, 108, 110 and 112. Audio segments 104, 106, 108, 110 and 112 may include ten words. Audio segments 104, 106, 108, 110 and 112 may include more than, or less than ten words. Audio segments 104, 106, 108, 110 and 112 may include 30 seconds of conversation time. Audio segments 104, 106, 108, 110 and 112 may include more than, or less than, 30 seconds of conversation time.

FIG. 2 shows audio segments 202, 204, 206, 208 and 210. Audio segments 202, 204, 206, 208 and 210 may be transcribed in parallel. Each audio segment may be transcribed through a unique instance of a transformer network. Audio segment 202 may be transcribed into transcription statement 222 through transformer neural network 212. Audio segment 204 may be transcribed into transcription statement 224 through transformer neural network 214. Audio segment 206 may be transcribed into transcription statement 226 through transformer neural network 216. Audio segment 208 may be transcribed into transcription statement 228 through transformer neural network 218. Audio segment 210 may be transcribed into transcription statement 230 through transformer neural network 220.

Transcription segments 222, 224, 226, 228 and 230 may be combined into combination 232. Combination 232 may have lost accuracy when being split and transcribed. Correction 234 may utilize a domain-specific correction module to correct inaccuracies identified in combination 232.

Figure 3:
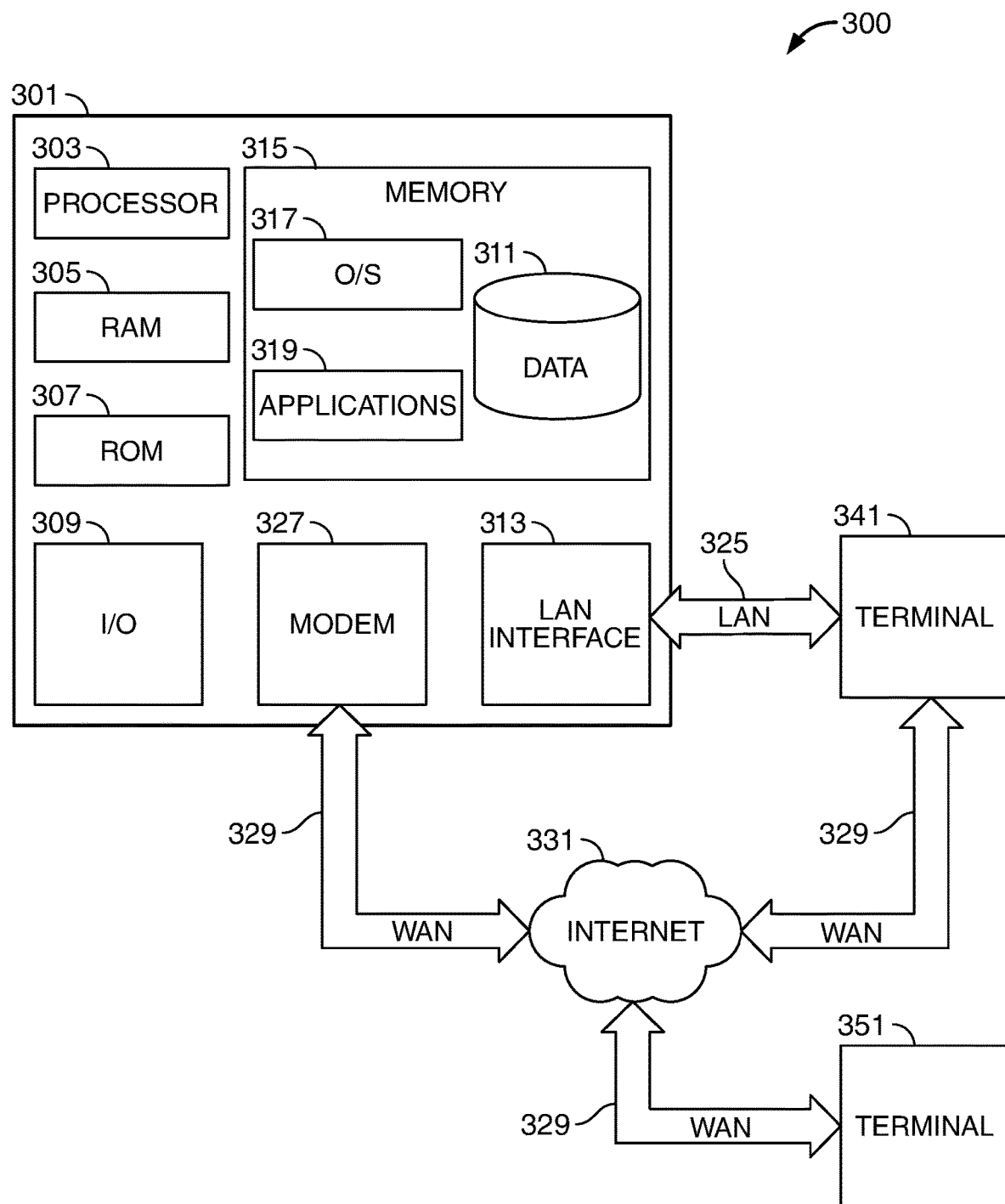
FIG. 3 shows still another illustrative diagram in accordance with principles of the disclosure.

FIG. 3 shows an illustrative block diagram of system 300 that includes computer 301. Computer 301 may alternatively be referred to herein as a "server" or a "computing device." Computer 301 may be a workstation, desktop, laptop, tablet, smart phone, or any other suitable computing device. Elements of system 300, including computer 301, may be used to implement various aspects of the systems and methods disclosed herein.

Computer 301 may have a processor 303 for controlling the operation of the device and its associated components, and may include RAM 305, ROM 307, input/output module 309, and a memory 315. The processor 303 may also execute all software running on the computer—e.g., the operating system and/or voice recognition software. Other components commonly used for computers, such as EEPROM or Flash memory or any other suitable components, may also be part of the computer 301.

Memory 315 may comprise any suitable permanent storage technology—e.g., a hard drive. Memory 315 may store software including the operating system 317 and application(s) 319 along with any data 311 needed for the operation of the system 300. Memory 315 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 301 may execute the instructions embodied by the software to perform various functions.

Input/output ("I/O") module may include connectivity to a microphone, keyboard, touch screen, mouse, and/or stylus through which a user of computer 301 may provide input. The input may include input relating to cursor movement. The input may relate to transaction pattern tracking and prediction. The input/output module may also include one or more speakers for providing audio output and a video display device for providing textual, audio, audiovisual, and/or graphical output. The input and output may be related to computer application functionality. The input and output may be related to transaction pattern tracking and prediction.

System 300 may be connected to other systems via a local area network (LAN) interface 313.

System 300 may operate in a networked environment supporting connections to one or more remote computers, such as terminals 341 and 351. Terminals 341 and 351 may be personal computers or servers that include many or all of the elements described above relative to system 300. The network connections depicted in FIG. 3 include a local area network (LAN) 325 and a wide area network (WAN) 329, but may also include other networks. When used in a LAN networking environment, computer 301 is connected to LAN 325 through a LAN interface or adapter 313. When used in a WAN networking environment, computer 301 may include a modem 327 or other means for establishing communications over WAN 329, such as Internet 331.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 319, which may be used by computer 301, may include computer executable instructions for invoking user functionality related to communication, such as e-mail, Short Message Service (SMS), and voice input and speech recognition applications. Application program(s) 319 (which may be alternatively referred to herein as "plugins," "applications," or "apps") may include computer executable instructions for invoking user functionality related to performing various tasks. The various tasks may be related to transaction pattern tracking and prediction.

Computer 301 and/or terminals 341 and 351 may also be devices including various other components, such as a battery, speaker, and/or antennas (not shown).

Terminal 351 and/or terminal 341 may be portable devices such as a laptop, cell phone, Blackberry™, tablet, smartphone, or any other suitable device for receiving, storing, transmitting and/or displaying relevant information. Terminals 351 and/or terminal 341 may be other devices. These devices may be identical to system 300 or different. The differences may be related to hardware components and/or software components.

Any information described above in connection with database 311, and any other suitable information, may be stored in memory 315. One or more of applications 319 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 4:
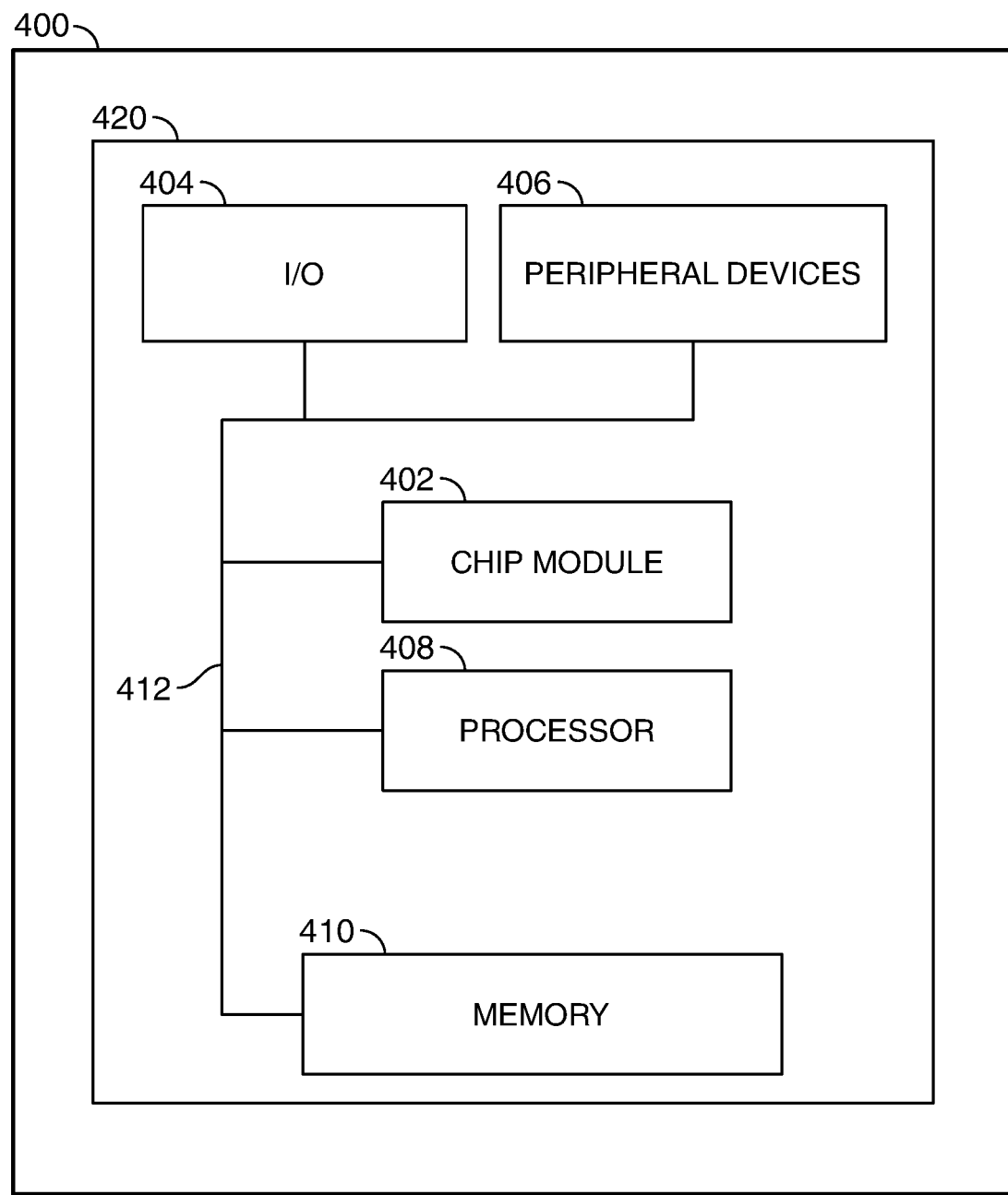
FIG. 4 shows yet another illustrative diagram in accordance with principles of the disclosure.

FIG. 4 shows illustrative apparatus 400 that may be configured in accordance with the principles of the disclosure. Apparatus 400 may be a computing machine. Apparatus 400 may include one or more features of the apparatus shown in FIG. 3. Apparatus 400 may include chip module 402, which may include one or more integrated circuits, and which may include logic configured to perform any other suitable logical operations.

Apparatus 400 may include one or more of the following components: I/O circuitry 404, which may include a transmitter device and a receiver device and may interface with fiber optic cable, coaxial cable, telephone lines, wireless devices, PHY layer hardware, a keypad/display control device or any other suitable media or devices; peripheral devices 406, which may include counter timers, real-time timers, power-on reset generators or any other suitable peripheral devices; logical processing device 408, which may compute data structural information and structural parameters of the data; and machine-readable memory 410.

Machine-readable memory 410 may be configured to store in machine-readable data structures: machine executable instructions (which may be alternatively referred to herein as "computer instructions" or "computer code"), applications, signals, and/or any other suitable information or data structures.

Components 402, 404, 406, 408 and 410 may be coupled together by a system bus or other interconnections 412 and may be present on one or more circuit boards such as 420. In some embodiments, the components may be integrated into a single chip. The chip may be silicon-based.

Thus, systems and methods for performance optimization for real-time large language speech to text systems are provided. Persons skilled in the art will appreciate that the present invention can be practiced by other than the described embodiments, which are presented for purposes of illustration rather than of limitation. The present invention is limited only by the claims that follow.

What is claimed is:

1. A method for maintaining accuracy in transcribing a communication, the method comprising:
   in a first environment:
      receiving a communication; and
      transcribing the communication, using a robust speech recognition machine learning model, said robust speech recognition machine learning model that uses noisy sources to provide a supervision signal for labeling training data, into a first transcription;
   in a second environment:
      receiving the communication;
      splitting the communication into a plurality of communication segments, each communication segment comprising two or more words;
      identifying a number of communication segments included in the plurality of communication segments;
      instantiating an instance of the robust speech recognition machine learning model for each communication segment included in the plurality of communication segments;
      assigning each communication segment, included in the plurality of communication segments, to a corresponding instance of the robust speech recognition machine learning model;
      transcribing, using parallel processing, each communication segment, the transcribing using the assigned instance of the robust speech recognition machine learning model, into a transcribed communication segment;
      combining the transcribed communication segments into a combined transcription; and
      correcting the combined transcription using a correction module, said correction module operable to tune transcriptions specific to a discipline;
   in a test environment:
      identifying a first resources consumed value, said first resources consumed value corresponding to a number of resources consumed by transcribing the communication model in the first environment;
      identifying a first accuracy level of the first transcription;
      identifying a second resources consumed value, said second resources consumed value corresponding to a number of resources consumed by transcribing the communication in the second environment model;
      determining that the first resources consumed value is greater than the second resources consumed value by over a predetermined resources value threshold;
      identifying a second accuracy level of the combined transcription;
      determining that the first accuracy level is greater than the second accuracy level by over a predetermined accuracy level threshold;
      identifying a third resources consumed value, said third resources consumed value corresponding to a number of resources consumed by correcting the combined transcription in the second environment;
      identifying a third accuracy level of the combined transcription upon completion of correcting the combined transcription using the correction module;
      determining that the third accuracy level is equivalent to or greater than the first accuracy level;
      identifying a fourth resources consumed value, the fourth resources consumed value comprising the second resources consumed value and the third resources consumed value; and
      determining that the fourth resources consumed value is less than the first resources consumed value.

2. The method of claim 1 further comprising using the second environment to transcribe incoming communications.

3. The method of claim 1 wherein the robust speech recognition machine learning model comprises a neural network.

4. The method of claim 1 wherein the communication occurs between a human caller and an interactive voice response system.

5. The method of claim 1 wherein each communication segment comprises thirty seconds of the communication.

6. The method of claim 1 wherein each communication segment comprises less than thirty seconds of the communication.

7. A method for maintaining accuracy in transcribing a communication, the method comprising:
   in a first environment:
      receiving a communication;
      transcribing the communication, using a machine learning model, into a first transcription;
      identifying a first value, said first value corresponding to a number of resources consumed by transcribing the communication using the machine learning model; and
      identifying a first accuracy level of the first transcription;
   in a second environment:
      receiving the communication;
      splitting the communication into a plurality of communication segments, each communication segment comprising two or more words;
      identifying a number of communication segments included in the plurality of communication segments;
      instantiating a second machine learning model for each communication segment included in the plurality of communication segments;
      assigning each communication segment, included in the plurality of communication segments, to the second machine learning model;
      transcribing, using parallel processing, each communication segment, the transcribing using the assigned instance of the machine learning model, into a transcribed communication segment;

combining the transcribed communication segments into a combined transcription; and correcting the combined transcription using a correction module, said correction module operable to tune transcriptions specific to a discipline;

in a test environment:

identifying a second value consumed by transcribing the communication using the plurality of instances of the machine learning model;

guaranteeing that the first value is greater than the second value by over a predetermined resources value threshold;

identifying a second accuracy level of the combined transcription;

guaranteeing that the first accuracy level is greater than the second accuracy level by over a predetermined accuracy level threshold;

identifying a third value consumed by correcting the combined transcription using the correction module;

identifying a third accuracy level of the combined transcription upon completion of correcting the combined transcription using the correction module;

guaranteeing that the third accuracy level is equivalent to or greater than the first accuracy level;

identifying a fourth value, the fourth value comprising the second value and the third value; and guaranteeing that the fourth value is less than the first value.

8. The method of claim 7 further comprising using the second environment to transcribe incoming communications.

9. The method of claim 7 wherein the machine learning model comprises a neural network.

10. The method of claim 7 wherein the communication occurs between a human caller and an interactive voice response system.

11. The method of claim 7 wherein each communication segment comprises thirty seconds of the communication.

12. The method of claim 7 wherein each communication segment comprises less than thirty seconds of the communication.

13. A communication transcription system comprising:

a first environment, the first environment comprising:

a transformer neural network, the transformer neural network operable to:

receive an audio communication; and transcribe the audio communication into a first transcription;

a second environment, the second environment comprising:

a receiver, the receiver operable to receive the audio communication;

a processor model, the processor model operable to segment the audio communication into a plurality of communication segments, each communication segment comprising thirty or less seconds of the audio communication;

a transcriber, the transcriber operable to:

instantiate an instance of a neural network for each communication segment included in the plurality of communication segments;

transcribe, in parallel, each communication segment, included in the plurality of communication segments, using the instance of the neural network instantiated for the communication segment;

combine the transcribed communication segments into a combined transcription; and correct the combined transcription using a corrector, said corrector operable to tune transcriptions specific to a discipline; and a test environment, the test environment operable to:

identify a first number of resources consumed by transcribing the communication using the neural network;

identify a first accuracy level of the first transcription;

identify a second number of resources consumed by transcribing the communication using the instances of the neural network;

determine that the first number of resources is greater than the second number of resources by over a predetermined resources value threshold;

identify a second accuracy level of the combined transcription;

determine that the first accuracy level is greater than the second accuracy level by over a predetermined accuracy level threshold;

identify a third number of resources consumed by correcting the combined transcription using the corrector;

identify a third accuracy level of the combined transcription upon completion of correcting the combined transcription using the corrector;

determine that the third accuracy level is equivalent to or greater than the first accuracy level;

identify a fourth number of resources, the fourth number of resources comprising the second number of resources and the third number of resources; and determine that the fourth number of resources is less than the first quantifiable resources value.

14. The communication transcription system of claim 13 further comprising using the second environment to transcribe incoming communications.

15. The communication transcription system of claim 13 wherein the audio communication may occur between a human caller and an interactive voice response system.

* * * * *